United States Patent
Bandyopadhyay et al.

(10) Patent No.: US 9,825,815 B2
(45) Date of Patent: Nov. 21, 2017

(54) SYSTEM AND METHOD FOR AGGREGATING AND ESTIMATING THE BANDWIDTH OF MULTIPLE NETWORK INTERFACES

(71) Applicant: Tata Consultancy Services Limited, Mumbai, Maharashtra (IN)

(72) Inventors: Soma Bandyopadhyay, West Bengal (IN); Shameemraj M Nadaf, West Bengal (IN)

(73) Assignee: Tata Consultancy Services Limited, Maharashtra (IN)

( * ) Notice: Subject to any disclaimer, the term of this patent is extended or adjusted under 35 U.S.C. 154(b) by 84 days.

(21) Appl. No.: 14/838,736

(22) Filed: Aug. 28, 2015

(65) Prior Publication Data
US 2015/0372872 A1    Dec. 24, 2015

Related U.S. Application Data

(63) Continuation-in-part of application No. 13/876,550, filed as application No. PCT/IN2011/000838 on Dec. 7, 2011, now abandoned.

(30) Foreign Application Priority Data

Feb. 2, 2011    (IN) ............................ 299/MUM/2011

(51) Int. Cl.
*H04L 12/24*    (2006.01)
*H04L 12/709*    (2013.01)
(Continued)

(52) U.S. Cl.
CPC ...... *H04L 41/0896* (2013.01); *H04L 43/0864* (2013.01); *H04L 45/245* (2013.01); *H04L 45/70* (2013.01)

(58) Field of Classification Search
None
See application file for complete search history.

(56) References Cited

U.S. PATENT DOCUMENTS 6,810,412 B1    10/2004    Chang
7,283,518 B2    10/2007    Vikberg et al.
(Continued)

FOREIGN PATENT DOCUMENTS

EP    1494426 A1    1/2005

OTHER PUBLICATIONS

M.A. Razzaque, Simon Dobson and Paddy Nixon "Context Awareness through Cross-Layer Network Architecture", Systems Research Group, School of Computer Science and Informatics,UCD, Dublin, Ireland2007 Science Foundation Ireland (SFI). Date: Aug. 13-16, 2007 pp. 1076-1081.
(Continued)

*Primary Examiner* — Min Jung
(74) *Attorney, Agent, or Firm* — Hayes Soloway PC

(57) ABSTRACT

The present invention provides a system and method for aggregating and estimating the bandwidth of the multiple network interfaces. Particularly, the invention provides a cross layer system for bandwidth aggregation based on dynamic analysis of network conditions. Further, the invention provides a system and method of estimation for evaluating bandwidth of multiple physical interfaces.

10 Claims, 2 Drawing Sheets

(51) Int. Cl.
    H04L 12/721    (2013.01)
    H04L 12/26     (2006.01)

(56) References Cited

U.S. PATENT DOCUMENTS

| | | | |
|---|---|---|---|
| 7,460,526 | B1 | 12/2008 | Hoffman et al. |
| 7,505,401 | B2 | 3/2009 | Kashyap |
| 8,489,720 | B1 | 7/2013 | Morford et al. |
| 2002/0016874 | A1 | 2/2002 | Watanuki et al. |
| 2004/0001512 | A1 | 1/2004 | Challener et al. |
| 2004/0250059 | A1 | 12/2004 | Ramelson et al. |
| 2005/0100009 | A1 | 5/2005 | Botvich |
| 2006/0085541 | A1 | 4/2006 | Cuomo et al. |
| 2008/0304519 | A1 | 12/2008 | Koenen et al. |
| 2009/0067440 | A1 | 3/2009 | Chadda et al. |
| 2011/0153816 | A1 | 6/2011 | Lloyd et al. |
| 2012/0054362 | A1* | 3/2012 | Tsao .................. H04L 12/66 709/232 |
| 2013/0111038 | A1* | 5/2013 | Girard .................. H04L 69/16 709/226 |

OTHER PUBLICATIONS

Justin Menga "Trunking and Bandwidth Aggregation"; CCNP Practical Studies: Switching; Oct. 2003.
Luiz C S Magalhaes and Robin Hillary Kravets "Transport Level Mechanisms for Bandwidth Aggregation on Mobile Hosts" Department of Computer Science University of Illinois, Urbana-Champaign, Date: Nov. 11-14, 2001.
Kai Hong, Shamik Sengupta, Rajarathnam Chandramouli "Cross-Layer MAC Enabling Virtual Link for Multi-Hop Routing in Wireless Ad Hoc Networks" Date: May 23-27, 2010, Communications (ICC), 2010 IEEE.
Thomas Davis "Bonding" Nov. 19, 2009 (Nov. 19, 2009), XP002673523 Retrieved date: Apr. 30, 2015.
Kameswari Chebrolu, Ramesh Rao "Bandwidth Aggregation for Real-Time Applications in Heterogeneous Wireless Networks" Year:-2006 Published in: Mobile Computing, IEEE Transactions on (vol. 5, Issue: 4 ), pp. 388-403.
Evensen, K.; Kaspar, D.; Engelstad, P.; Hansen, A.F.; Griwodz, C.: Halvorsen, P.; Simula Res. Lab., Lysaker "A Network-Layer Proxy for Bandwidth Aggregation and Reduction of IP Packet Reordering" in Local Computer Networks, 2009.
Hari Adiseshu, Guru Parulkar and George Varghese "A Reliable and Scalable Striping Protocol" Aug. 28, 1996.
Alex C. Snoeren "Adaptive Inverse Multiplexing for Wide-Area Wireless Networks" Defense Advanced Projects Research Agency (DARPA) contract No. DAAN02-98-K0003. Dec. 1999.
Julian Chesterfield, Rajiv Chakravorty, Ian Pratt, Suman Banerjee, Pablo Rodriguez "Exploiting diversity to enhance multimedia streaming over cellular links," in INFOCOM, Mar. 2005.
Mayukh Saubhasik, Uwe Schmidt "Bandwidth Estimation and Rate Control in BitVampire" CPSC 527: Advanced Computer Networks. dated 2010.
Jiri Navratil and R. Les. Cottrell "ABwE: A Practical Approach to Available Bandwidth Estimation" Stanford Linear Accelerator Center (SLAC), 2575 Sand Hill Road, Menlo Park, California 94025, Year 2003.
T.G. Sultanov, A.M. Sukhov "Simulation technique for available bandwidth estimation" Jul. 20, 2010, Russia.
Kameswari Chebrolu, Bhaskaran Raman, Ramesh Rao "A Network Layer Approach to Enable TCP over Multiple Interfaces" vol. 11 Issue 5, Sep. 2005.
Taleb et al., A Bandwidth Aggregation-Aware QoS Negotiation Mechanism for Next-Generation Wireless Networks, IEEE transactions on multimedia, vol. 11, No. 6, Oct. 2009.
A. Habib, N. Christin, and J. Chuang "Taking advantage of multihoming with session layer striping," in INFOCOM, 2006.
Asfandyar Qureshi & John Guttag "Horde: Flexible Application Driven Network Striping" Mar. 21, 2005.
Eric Setton, Taesang Yoo, Xiaoqing Zhu, Andrea Goldsmith and Bernd Girod "Cross-Layer Design of Ad Hoc Networks for Real-Time Video Streaming" Information Systems Laboratory, Department of Electrical EngineeringStanford University, Stanford, CA94305-9510, USA, dated Aug. 22, 2005.
T. Taleb, K. Kashibuchi, A. Leonardi, S. Palazzo, K. Hashimoto, N. Kato, and Y. Nemoto, "A cross-layer approach for an efficient delivery of TCP/RTP-based multimedia applications in heterogeneous wireless networks," IEEE Trans. Veh. Technol., vol. 57, No. 6, pp. 3801-3814, Nov. 2008.
Srinivas Shakkottai, Eitan Altman, Anurag Kumar "The Case for Non-cooperative Multihoming of Users to Access Points in IEEE 802.11 WLANs" dated Apr. 2006, pp. 1-12INFOCOM 2006. 25th IEEE International Conference on Computer Communications. Proceedings.
Stefan Aust et al, IEEE, Evaluation of Linux Bonding Features, Communication Technology, 2006. ICCT '06. International Conference on, Nov. 27-30, 2006 pp. 1-6.
Sun Microsystems, Inc. "System Administration Guide: Network Interfaces and Network Virtualization" Chapter 7, Introducing IPMP, p. 95 to 120, U.S.A. Year: Jan. 2008.
Prof. Andrea Goldsmith; et al "Cross-Layer Design of Ad-Hoc Wireless Networks for Real-Time Media" Stanford University, document retrieved on Sep. 14, 2017. link: http://msw3.stanford.edu/~zhuxq/adhoc/#Findings.
James Curtis, Tony McGregor "Review of Bandwidth Estimation Techniques" ,2001.

* cited by examiner

SYSTEM AND METHOD FOR AGGREGATING AND ESTIMATING THE BANDWIDTH OF MULTIPLE NETWORK INTERFACES

CROSS REFERENCE TO RELATED APPLICATION

This application is a continuation-in-part application of U.S. patent application Ser. No. 13/876,550, filed Dec. 7, 2011, the entire disclosure of which is incorporated herein by reference.

FIELD THE INVENTION

The present invention relates to the field of telecommunication. Particularly, the invention relates to a cross layer system for bandwidth aggregation and estimation further based on dynamic analysis of network conditions. More particularly, the invention provides a system and method that estimates bandwidth of multiple physical interfaces and distributes it further to such multiple physical interfaces.

BACKGROUND OF THE INVENTION

Data transfer through multiple physical interfaces is widely studied for improving the total available bandwidth for network based applications. Most of the related work in this area requires proxy architecture, service level agreement and counter component at the destination, to realize the bandwidth aggregation either in adaptive and non-adaptive manners. Some of the prior arts known to us will now be discussed to understand the available technical solutions and shortcomings in the state of the art.

A network layer architecture consisting of an infrastructure proxy as mentioned reference number #1 of the prior art references or a multilink proxy as mentioned reference number #2 of the prior art references is used for simultaneous use of multiple interfaces and aggregation of the throughput of heterogeneous downlink streams.

The approach suggested in reference number #3 of the prior art references, uses a dynamic packet reordering mechanism of TCP streams over multiple links; also it requires a network proxy. Service level agreement as well as proxy is used in the middle of the network for scheduling the packets through multiple interfaces as mentioned in reference number #4.

Architecture for session-layer striping over multiple links is proposed in reference number #5 which is based on single virtual layer socket. Furthermore reference number #6, describes a network middleware called Horde, which enables applications to control certain aspects of data stripping over multiple interfaces. It is further disclosed that this middleware architecture comprises 3 layers in which the higher layer provides an interface to interact with Horde; middle layer handles packet scheduling, bandwidth allocation, and the lower layer deals with network channels.

The cross layer framework as mentioned in prior art reference number #7 proposes adaptation across many layers of the protocol stack to support delay-critical applications in adhoc scenario, such as conversational voice or real-time video.

The work presented in prior art reference number #8 proposes to make changes to the five layers namely physical, data link, application, network, and transport layer like TCP to provide seamless delivery of multimedia services in heterogeneous wireless networks. Some modifications have been made to the Transport protocols that eventually make deployment of such an approach as difficult as it needs a corresponding component at the destination.

Prior art reference number #8 discloses a dynamic QoS negotiation scheme for enabling bandwidth aggregation for video streaming in wireless networks. It is disclosed that multiple interfaces of the same technology can be striped for better performance at the link layer, which is referred to as bonding or trunking. Prior art reference number #10 discloses a method of bandwidth aggregation on the link layer by striping data across bundle of physical channels.

An adaptive inverse multiplexing technique has been disclosed in prior art reference number #11 where IP Packets are fragmented by the multiplexor and tunneled through multiple links using ML PPP (multi link ppp) over a link layer transfer protocol.

A method for channel aggregation in cellular networks is disclosed in prior art reference number #12. The reference suggests that in order to improve resilience, parity codes are applied across channels rather than across packets.

Another interesting approach is followed in prior art reference number #13, where it is proposed that users of WLANs should be able to multihome and split their traffic among all available access points, based on obtained throughput and a charged price. However, a link-layer solution of striping data through heterogeneous networks and to different IP addresses is not feasible because the link layer has no notion of IP.

U.S. Pat. No. 6,810,412 by Chang, et al. teaches a communication network having a server which communicates with a switch using a high bandwidth connection. The said prior art discloses a network interface which needs counter components (Client server based architecture), and server using a single interface. It requires an intermediate switch/network proxy architecture which is responsible for distribution of the data traffic among the client and server. It does not perform any network estimation while performing the bandwidth aggregation.

U.S. Pat. No. 7,460,526 by Hoffman et al. teaches a system and method for establishing an inverse multiplexed connection using layer one resources dedicated to a carrier virtual network. The said prior art discloses a system and method which requires a service level agreement to perform the aggregation, based on network demands and needs specific network architecture—example network management system. It also establishes a carrier virtual network and works with three different telecommunication networks and an aggregator. The aggregation is done by the network manager.

It is submitted that, all the approaches described above demand modifications at both ends (i.e. server and client) to achieve bandwidth aggregation and most of the approaches are tested in simulations, often based on very simple assumptions.

Further Bandwidth estimation of the network in real-time is also an appealing problem and has attracted quite a few research works. Most of the works in this area are based on RTT (round-trip-time) measurement, using a single or multiple probe packets. Theory, improvements and some implementations related to Bandwidth estimation techniques based on RTT mechanism have been discussed as mentioned in prior art reference number #14. UDP based probe packet mechanism is used to measure the bandwidth estimation and rate control in a P2P (peer-to-peer) based video streaming application as mentioned in prior art reference number #15. The available bandwidth is calculated depending on the determined RTT values the upload bit rates. The estimated bandwidth determines whether to accept or reject a new P2P client requesting a connection at a random data rate. This method results in unstable RTT measurements since set of peers may be located anywhere in the world.

Prior art reference number #16 discloses, use of pair of probe packets with a fixed delay and packet pair dispersion technique is used to measure the available bandwidth. Along with the RTT calculation the time delay between the probe packets is measured and analyzed to predict the network bandwidth.

A variable size probe packet can also be used to measure the available bandwidths as disclosed in prior art reference number #17. Along with RTT the packet size is also used in this case to estimate the network capacity. Here a testing network including a test box measurement infrastructure is used.

U.S. Pat. No. 7,505,401 by Kashyap et al, teaches a method, apparatus and program storage device for providing mutual failover and load-balancing between interfaces in a network is disclosed. The said prior art provides method for network connections for mutual failover and load sharing using multiple interfaces, one interface used as a backup of another interface. It uses multiple virtual interfaces. It does not perform any estimation of bandwidth while performing the load sharing.

Some of the lacunae that exists in the prior art discussed above are that, firstly these research efforts are based on single or multiple interfaces and need counterpart in the destination; secondly the prior arts have not used multiple interfaces simultaneously to perform the bandwidth estimation. These approaches also do not make use of any cross layer technique.

Thus there exists a need to solve the long standing problem of bandwidth aggregation without using any corresponding component at the final destination or at any node, or a particular network architecture, or using any network proxy or management node and also without performing any modifications in the physical and data link layers and also estimating bandwidth of multiple physical interfaces.

OBJECTIVES OF THE INVENTION

The primary objective of the invention is to provide a cross layer system which can perform bandwidth aggregation based on dynamic analysis of network condition, without using any corresponding component/counter component, or without using any network proxy or management system, or any specific network architecture.

Another objective of the present invention is to provide a method and system that provides a gateway of all data paths from upper layers to a data-link, physical layer through IP and vice versa.

Another objective of the present invention is to provide a method and system that uses a predefined internee control message protocol (ICMP) echo packet for measuring the network channel condition.

Another objective of the present invention is to provide a method and system for enhancing the bandwidth of a system significantly by adding up the available bandwidth of the existing active communication interfaces.

Another objective of the present invention is to provide a method and system for estimating the channel/network condition associated with each active physical interface.

Yet another objective of the invention is to provide a method and system for bandwidth aggregation that can be used for any transport layer protocol like TCP (transport control protocol) or UDP (user datagram protocol).

Yet another objective of the invention is to provide a method and system that can be configured to operate in aggregation mode or aggregation combination with estimation mode.

Still another objective of the invention is to provide a method and system for enabling the analysis for the transport header (TCP) statistic for performing bandwidth estimation.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present invention provides a cross layer system which can perform bandwidth aggregation based on dynamic analysis of network condition.

In one aspect of the invention a method and system is provided for providing a gateway of all data paths from upper layers to a data-link, physical layer through IP and vice versa. In another aspect of the invention a method and system is provided that enhances the bandwidth of a system significantly by adding up the available bandwidth of the existing active communication interfaces.

In another aspect of the invention a method and system is provided that uses a predefined internet control message protocol (ICMP) echo packet for measuring the network channel condition.

In another aspect of the invention channel/network condition associated with each active physical interface are estimated.

Another aspect of the invention is to provide a bandwidth aggregation and estimation methods and system which can be used for any transport layer protocol like TCP (transport control protocol) or UDP (user datagram protocol).

Still another aspect of the invention is to provide a method and system for analysis the transport header (TCP) statistics to perform the bandwidth estimation.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings a few exemplary constructions of the invention; however, it is to be understood that the invention is not limited to the specific methods and system disclosed in the drawings.

DETAILED DESCRIPTION OF THE INVENTION

Figure 1:
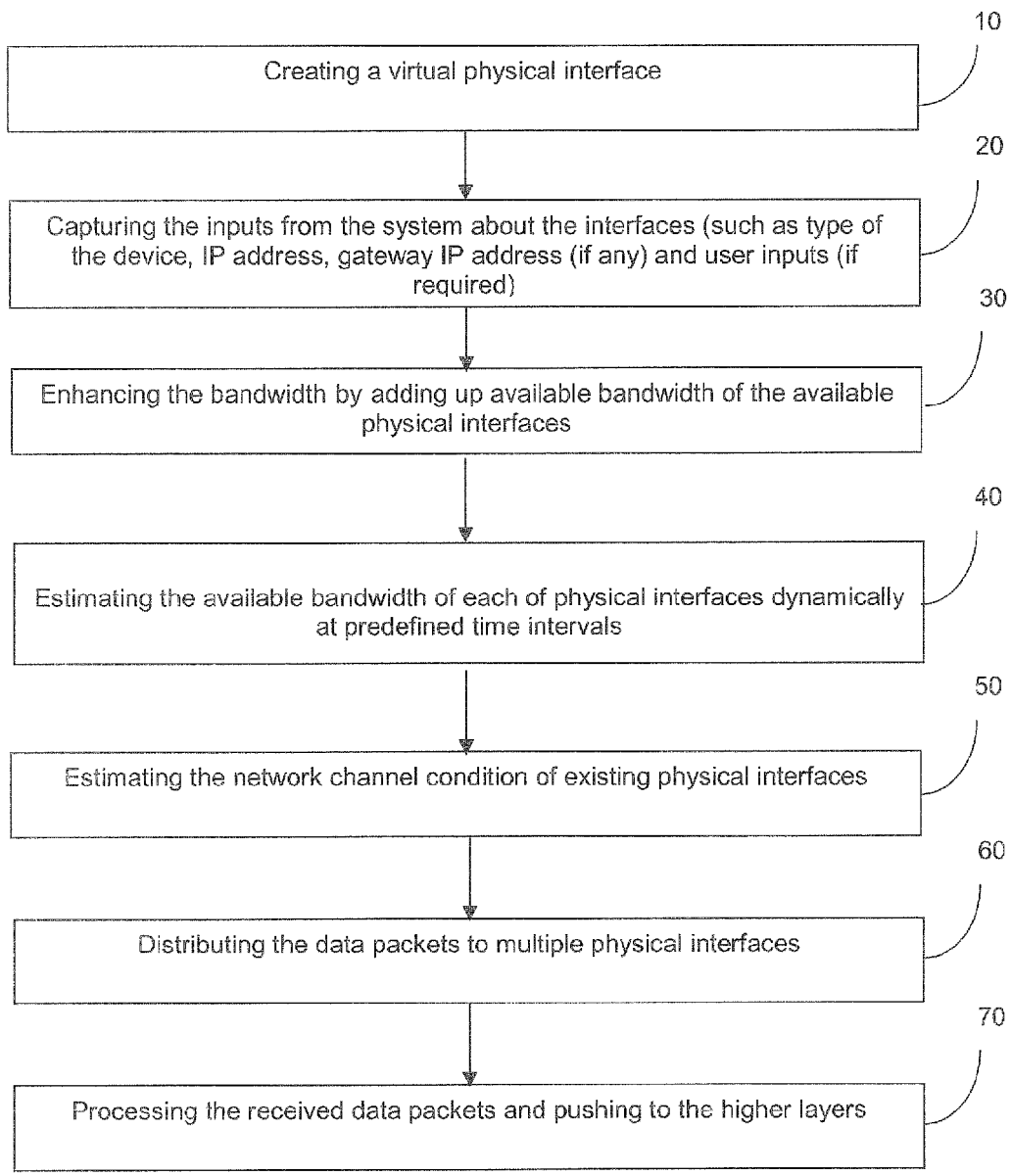
FIG. 1 is a flow diagram depicting method for aggregating and estimating the available bandwidth of multiple physical interfaces.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

Generally, the present invention relates to field of telecommunications. Particularly, this invention relates to a cross layer system which can perform bandwidth aggregation based on dynamic analysis of network condition.

The present invention provides a system for aggregating and estimating the bandwidth of the multiple physical interfaces, wherein the said system comprises:
 a) one network driver module for aggregating and estimating the bandwidth of the multiple physical interfaces;
 b) a user space of the network driver module for receiving the user defined input; and
 c) physical interface connected with the network driver module for data transmission & estimation; and
 d) at least two physical interfaces connected with the network driver module for aggregating, as well as estimating their bandwidths.

The present invention also provides a method for aggregating and estimating the available bandwidth of multiple physical interfaces using a network driver module, wherein the said method comprises the processor implemented steps of:
 a) creating a virtual physical interface for encapsulating at least one existing physical interface;
 b) enhancing the bandwidth by adding up available bandwidth of the active physical interfaces;
 c) estimating the available bandwidth of each of physical interfaces dynamically at predefined time intervals;
 d) estimating the network channel condition of existing physical interfaces by the network driver module; and
 e) distributing the data packets to multiple physical interfaces based on the estimated network channel condition by the network driver module.

According to one of the embodiments, the present invention enables data over physical layer to communicate over both wireless and wired communication medium.

The present invention finds utility in wireless communication field and may be used to transfer data over short distances or long distances. It encompasses use of any type of fixed, mobile, and portable two-way radios, cellular telephones, personal digital assistants (PDAs), and wireless networking.

The present invention also finds utility in wired communication field and may be used for the transmission and reception of data over a wire-based communication technology. Examples include telephone networks, cable television or interact access, and fiber-optic communication.

According to one of the preferred embodiments of the invention the proposed cross layer system enhances the download and upload data transmission rates of application due to increase in bandwidth aggregation and thus enhances the QoS (quality of services).

In one embodiment the network drive module creates a 'virtual physical' interface which encapsulates all existing active physical interface present in the computing system. The said system thus does not perform any modifications in the physical and data-link layer of existing physical interface.

In one embodiment of the invention the network drive module provides a single communication pipe for flow of data from internet protocol (IP) to physical interface. The module also provides reception and transmission of the data to the various layers.

In one embodiment of the invention the network drive module enhances the bandwidth of system significantly by adding up available bandwidths of the existing active communication interfaces. The said system further comprises probe packet mechanism to estimate the channel condition of the active physical interfaces.

FIG. 1 depicts a flow diagram for aggregating and estimating the available bandwidth of multiple physical interfaces according to one exemplary embodiment of the invention. The process starts at the step 10 wherein a virtual physical interface is created for encapsulating at least one existing physical interface by a network driver module. At the step 20, system inputs are captured and user defined inputs are taken if require. At the step 30, bandwidth is enhanced by adding up available bandwidths of the multiple physical interfaces. At the step 40, the available bandwidth of each of physical interface is estimated dynamically at predefined time intervals. At the step 50, the network channel condition of existing physical interfaces is estimated by the network driver module. At the step 60, wherein the data packets are distributed to multiple physical interfaces based on the estimated network channel condition by the network driver module. The process ends at the step 70, upon reception the packets are processed by this module and pushed to the higher layers, wherein the network driver module uses packet filtering (net filter) mechanism and associates a hook function for processing the received packets. The hook function is used to filter the packets just after their reception by the active interfaces. The associated hook function of the packet-filter performs the necessary modifications in the data packets, and assembles the data packet before sending to the application.

Figure 2:
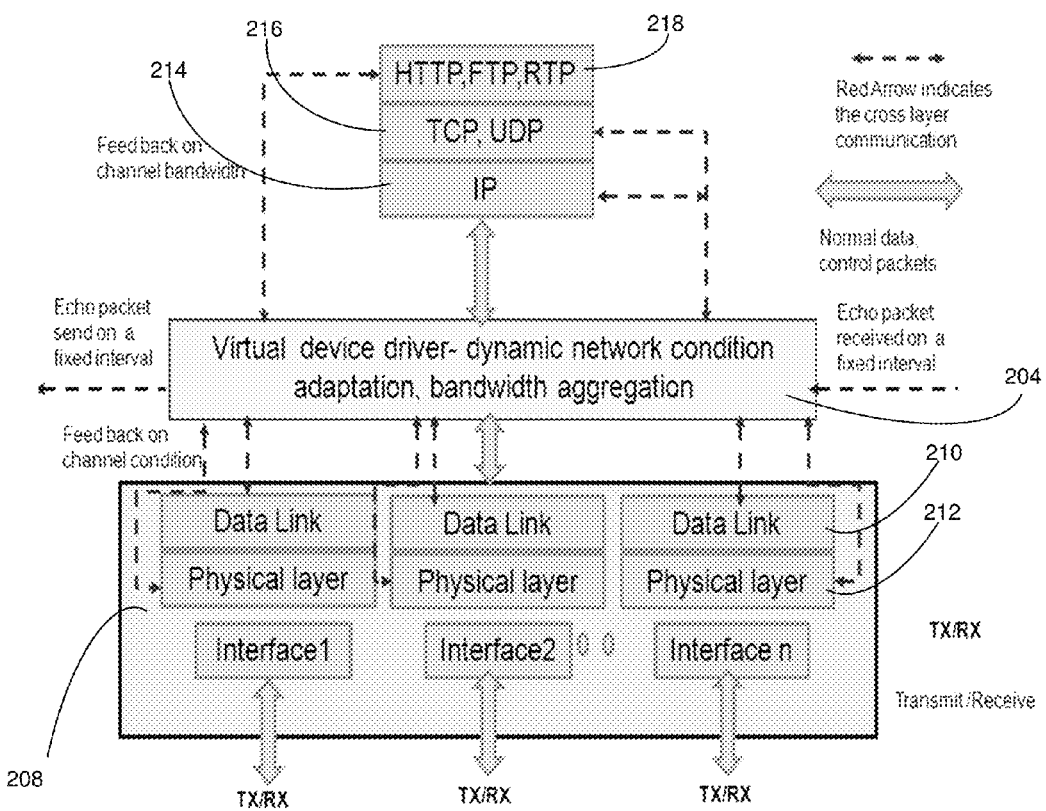
FIG. 2 is a flow diagram that illustrates functional blocks of bandwidth aggregation system.

FIG. 2 illustrates a system architecture diagram for functional blocks of bandwidth aggregation system. The said system comprises a network driver module 204, a physical interface 208, data link 210, physical layer 212, Internet Protocol (IP) 214, transport protocol header 216, and port number 218.

The system further comprises, a user space 206 (not shown in figure), and a kernel space 207 (not shown in figure).

According to one of the preferred embodiments of the invention, the said user space 206 exposes APIs (application programming interfaces) to gather the user defined inputs, as well as system captured inputs. The said user defined inputs comprise;
 a. Domain name of the server with a public IP address to which the probe packets are to be sent for estimation of available bandwidth of the network interfaces.
 b. Time interval for performing network estimation
 c. QoS requirement of an application (optional)
 d. Other optional parameters (like enabling or disabling network estimation)

The user inputs are provided by the user through command line.

The said system defined inputs comprise;
a. Information about the network interfaces (interface identifier, IP addresses, IP address of gateways if any) available for bandwidth aggregation and estimation. System captured inputs are obtained by doing an ioctl( ) function call with a datagram socket.
b. Information about the status of the virtual physical interfaces/device (i.e. interface is UP, or DOWN, or any change in interface/device status) is also obtained.

In another embodiment of the invention the kernel space 207 acts as a bridge between applications and the actual data processing. The user space 206 and kernel space 208 have a close bonding and both these components exchange control information by using ioctl ( ) function call with a raw socket such as:
a. GETINFO: to collect information available with kernel space module about the network interfaces for aggregation.
b. SETINFO: to pass the information about the available network interfaces to the kernel space module.
c. NDMINFO (Network Diagnostics): to pass information related to bandwidth estimation to the kernel space module and also to collect the information about the available bandwidth of the network interfaces from the kernel space module.

In another embodiment of the invention the said system acts as a gateway of all the data paths from Internet protocol IP 214 (interne protocol) to the physical layer 212, starting from applications/upper layers and vice-versa. It distributes the data while transmitting among the existing active physical interfaces 208 based on the quality of services (QoS) requirement as specified by the application or by using the default configuration. It receives the data from the respective interfaces 208 and passes to the respective applications.

In another embodiment of the invention the network driver module 204 creates a virtual interface and assigns an IP address, netmask to it and adds this interface as the as default entry in the routing table. All the application data that comes from upper layer uses this IP address as the source address.

In another embodiment of the invention the network driver module 204 replaces its own IP address with the corresponding active physical interfaces 208' IP addresses while distributing the data to those interfaces and performs the necessary checksum calculations for Internet protocol IP 214 and transport protocols headers 216 as required. During reception it replaces the actual IP addresses of those interfaces with its own IP address and performs the necessary checksum calculations for interne protocol IP 214 and transport protocols headers 216.

In another embodiment of the invention the network driver module 204 uses the active interfaces/devices as its slave network interfaces. It distributes the data packets from application based on some predefined identifiers for example port number 218 (HTTP packet or FTP packet etc.) and quality of services' QoS requirement as specified by the application (optional) through its user space module 206. It sends the distributed data packets directly to the transmit queue of its slave interfaces i.e. the active physical interface 208. It uses packet filtering (net filter) mechanism and associates a hook function for this purpose in the receive path. The hook function is used to filter the packets just after their reception by the active interfaces. The associated hook function of the packet-filter performs the necessary modifications in the data packets, and assembles the data packet before sending to the application.

In another embodiment of the invention the proposed system uses a predefined internet control message protocol (ICMP) echo packet 222 for measuring the network channel condition. The internet control message protocol (ICMP) echo packet is sent to any public IP address (for example—www.google.com) defined by user simultaneously through the existing multiple active interfaces. The destination with the public IP address sends back the echo-reply to active physical interface 208. The Proposed system determines the time differences between the sent ICMP echo and received ICMP echo-reply packets i.e., the round trip time (RTT) for the active interfaces and estimates the network condition. The time difference with a higher value signifies a poor network condition. The system maintains a timer which makes an echo packet to be sent at a fixed time interval (configurable).

In another embodiment of the invention the proposed system also analyses the transport header 216 (TCP) statistics and takes the average RTTs obtained from both the transport header 216 and ICMP probe packet.

In still another embodiment of the invention the cross layer aware bandwidth aggregation system as presented here, can enhance the bandwidth of a system significantly by adding up the available bandwidths of the existing active communication interfaces (wired and wireless) by the network driver module 204 without performing any modifications in the physical layer 212 and data link layer 210 of the existing interfaces. At the same time it estimates the channel/network condition associated with each active physical interfaces 208. The system does not need any counterpart or corresponding module in any node including the final destination or end system of the communication link. It can be used for any transport layer protocol 216 like TCP (transmission control protocol) and UDP (user datagram protocol). Importantly, it does not require any service level agreement and a proxy support. It can perform an adaptive bandwidth aggregation.

A method for aggregating bandwidth of multiple physical interfaces, comprising processor implemented steps of creating a virtual physical interface for encapsulating multiple physical interfaces of a system; estimating a network channel condition for active physical interfaces of the multiple physical interfaces by sending a pre-defined Internet control message (ICMP) echo packet from each of the active physical interfaces to a public IP address, receiving a echo reply, corresponding to the a pre-defined ICMP echo packet, from the public IP address, and determining a time difference between the sent ICMP echo packet and received echo reply, wherein the time difference indicates a round trip time (ITT) for each of the active physical interfaces, thereby estimating the network channel condition for each of the active physical interfaces; distributing data packets to each of the active physical interfaces based on the network channel condition of each of the active physical interfaces, wherein the data packets, received at each of the active physical interface, is filtered using a hook function of a packet filtering mechanism in order to perform necessary modifications in the data packets before sending the data packets to an application; estimating a bandwidth for each of the active physical interfaces based on the network channel condition; and aggregating the bandwidth of each of the active physical interfaces for enhancing the bandwidth of the computing system, wherein the bandwidth aggregation is performed using a cross layer technique, wherein the cross layer technique facilitates interaction amongst plurality of layers associated with internet protocol (IP).

The virtual physical interface is created by a network driver module. The virtual physical interface resides as a default entry in a routing table. The network driver module replaces its own interact protocol (IP) address with IP address of the active physical interfaces for transmission of the data packets to the active physical interfaces. The network driver module replaces the IP address of the active physical interfaces with its own IP address for sending the data packets to the application. Bandwidth aggregation is performed without using a network proxy or management system, or any specific network architecture, without using counter component, or corresponding module at the destination, or end system. Further, bandwidth aggregation is performed without using a service level agreement.

In another aspect, a system for aggregating bandwidth of multiple physical interfaces, is provided. The system comprises, a processor; a memory coupled to the processor, wherein the processor is capable of executing program instructions stored in the memory, the program instructions that are configured to cause the processor to create a virtual physical interface for encapsulating multiple physical interfaces of a system; estimate a network channel condition for active physical interfaces of the multiple physical interfaces by sending a pre-defined internet control message (ICMP) echo packet from each of the active physical interfaces to a public IP address, receiving a echo reply, corresponding to the a pre-defined ICMP echo packet, from the public IP address, and determining a time difference between the sent ICMP echo packet and received echo reply, wherein the time difference indicates a round trip time (RTT) for each of the active physical interfaces, thereby estimating the network channel condition for each of the active physical interfaces; distribute data packets to each of the active physical interfaces based on the network channel condition of each of the active physical interfaces, wherein the data packets, received at each of the active physical interface, is filtered using a hook function of a packet filtering mechanism in order to perform necessary modifications in the data packets before sending the data packets to an application; estimate a bandwidth for each of the active physical interfaces based on the network channel condition; and aggregate the bandwidth of each of the active physical interfaces for enhancing the bandwidth of the computing system, wherein the bandwidth aggregation is performed using a cross layer technique, wherein the cross layer technique facilitates interaction amongst plurality of layers associated with internet protocol (IP). The virtual physical interfaces are created by network driver module. The network driver module replaces its own IP address with IP address of the active physical interface for transmission of the data packets to the active physical interfaces. The network driver module replaces the IP address of the active physical interfaces with its own IP address for sending the data packets to the application.

During the process of data distribution, the processor measures the channel condition of each interface by transmitting an echo request through each interface independently. In one example embodiment, if Round Trip Time (RTT) and Transport Header Statistics (THS) indicate a favorable channel condition, where the favorable channel condition is demonstrated by either a high throughput or lower value of RTT, the network driver module estimates and allocates additional bytes to a corresponding interface for data transmission.

This estimation of assessing whether additional bytes have to be allocated to the corresponding interface is performed by the processor. The processor may not require a separate Ethernet interface to measure a link state or does not require changes in the form of a window size variation of Transmission Control Protocol (TCP) to handle network congestion, which is commonly prevalent under such circumstances.

In one example embodiment, interface-1, interface 2, interface n possesses a channel condition signified by $C_{i1}$ (RTT,THS), and—$C_{i2}$ (RTT,THS) and is $C_{i22}$ (RTT,THS), respectively. In case, ith. interface $C_{ii}$ indicates the most favorable channel condition among "n" interfaces, the network driver module allocates additional bytes to 'i' th interface for data transfer.

Consider an example, where a user is simultaneously working with two applications such as downloading a movie, and browsing through a website. During this operation, the network driver module is considered to be installed in the computing device used for browsing. In case, the computing device includes at least two interfaces, and when Interface 1 (Ci1) indicates a more favorable network channel condition than interface 2 Ci2 then the network driver module performs an intervention. By performing the intervention, movie download can be carried out through Interface 1(Ci1) and browsing of the website can be enabled through Interface2 Ci2.

The embodiments utilize a Linux Kernel Netfilter Utility in order to filter data packets. before sending an outgoing packet on the physical interface queue, the source IP is altered to match the IP of the physical interface on to which the packet is to be sent. For incoming packet, after the packet is received from the physical interface queue, the destination IP is altered to match the IP of the virtual interface created by the kernel module. All the user applications are attached to the virtual interface and hence the IP translation is necessary. The hook function maintains a list of flows with corresponding physical interfaces.

Further, the processor facilitates aggregation of the throughput or bandwidth of the interfaces it uses at any period of time. The throughput of a virtual interface is considered to equivalent to the sum of the throughput of active interfaces that are actively participating during the process of data transmission.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

ADVANTAGES OF THE INVENTION

1) The present invention does not require any counter component, or corresponding module at the destination or, end system to perform bandwidth aggregation and estimation—therefore it is easy to deploy, manage and at the same time cost effective.

2) The present invention provides a method and system which does not require any proxy to perform bandwidth aggregation and estimation.

3) The present invention provides a method and system wherein aggregation is done based on the bandwidth estimation, i.e. this invents a method of adaptive bandwidth aggregation.

4) The present invention provides a method and system which enhances the download and uploads data transmission rates of the application and hence enhances the QoS (quality of service).

5) The present invention does not require any service level agreement and a proxy support and it can perform an adaptive bandwidth aggregation by using multiple physical interfaces.

We claim:

1. A method for aggregating bandwidth of multiple physical interfaces, wherein the said method comprises processor implemented steps of:
    creating a virtual physical interface for encapsulating multiple physical interfaces of a system;
    estimating a network channel condition for each of active physical interfaces of the multiple physical interfaces by:
        sending a pre-defined internet control message (ICMP) echo packet from each of the active physical interfaces to a public IP address,
        receiving a echo reply for the each of the active physical interfaces, corresponding to the a pre-defined ICMP echo packet, from the public IP address, and
        determining a time difference between the sent ICMP echo packet and received echo reply, wherein the time difference indicates a round trip time (RTT) for each of the active physical interfaces, thereby estimating the network channel condition for each of the active physical interfaces;
    estimating a bandwidth for each of the active physical interfaces based on the network channel condition;
    distributing data packets to each of the active physical interfaces based on the network channel condition of each of the active physical interfaces, wherein the data packets, received at each of the active physical interface, is filtered using a hook function of a packet filtering mechanism in order to perform necessary modifications in the data packets before sending the data packets to an application; and
    aggregating the bandwidth of each of the active physical interfaces for enhancing the bandwidth of the computing system, wherein the bandwidth aggregation is performed using a cross layer technique, wherein the cross layer technique facilitates interaction amongst plurality of layers associated with internet protocol (IP).

2. The method as claimed in claim 1, the virtual physical interface is created by a network driver module, and wherein the virtual physical interface resides as a default entry in a routing table.

3. The method as claimed in claim 2, wherein the network driver module replaces its own internet protocol (IP) address with IP address of the active physical interfaces for transmission of the data packets to the active physical interfaces.

4. The method as claimed in claim 2, wherein the network driver module replaces the IP address of the active physical interfaces with its own IP address for sending the data packets to the application.

5. The method as claimed in claim 1, wherein the bandwidth aggregation is performed without using a network proxy or management system, or any specific network architecture.

6. The method as claimed in claim 1, wherein the bandwidth aggregation is performed without using counter component, or corresponding module at the destination, or end system.

7. The method as claimed in claim 1, wherein the bandwidth aggregation is performed without using a service level agreement.

8. A system for aggregating bandwidth of multiple physical interfaces, wherein the said system comprises:
    a processor;
    a memory coupled to the processor, wherein the processor is capable of executing program instructions stored in the memory, the program instructions that are configured to cause the processor to:
        create a virtual physical interface for encapsulating multiple physical interfaces of a system;
        estimate a network channel condition for each of active physical interfaces of the multiple physical interfaces by:
            sending a pre-defined internet control message (ICMP) echo packet from each of the active physical interfaces to a public IP address,
            receiving a echo reply for the each of the active physical interfaces, corresponding to the a pre-defined ICMP echo packet, from the public IP address, and
            determining a time difference between the sent ICMP echo packet and received echo reply, wherein the time difference indicates a round trip time (RTT) for each of the active physical interfaces, thereby estimating the network channel condition for each of the active physical interfaces;
        estimate a bandwidth for each of the active physical interfaces based on the network channel condition;
        distribute data packets to each of the active physical interfaces based on the network channel condition of each of the active physical interfaces, wherein the data packets, received at each of the active physical interface, is filtered using a hook function of a packet filtering mechanism in order to perform necessary modifications in the data packets before sending the data packets to an application; and
        aggregate the bandwidth of each of the active physical interfaces for enhancing the bandwidth of the computing system, wherein the bandwidth aggregation is performed using a cross layer technique, wherein the cross layer technique facilitates interaction amongst plurality of layers associated with internet protocol (IP).

9. The system as claimed in claim 8, wherein the virtual physical interfaces is created by network driver module, and wherein the network driver module replaces its own IP address with IP address of the active physical interface for transmission of the data packets to the active physical interfaces.

10. The system as claimed in claim 8, wherein the network driver module replaces the IP address of the active physical interfaces with its own IP address for sending the data packets to the application.

* * * * *